United States Patent Office 3,257,248
Patented June 21, 1966

3,257,248
PLASTICIZED SOLID PROPELLANT COMPOSITIONS CONTAINING VINYLIDENE TYPE POLYMERS AND POLYFUNCTIONAL CURING AGENTS
James N. Short and Charles C. Bice, both of Bartlesville, Okla., assignors to Phillips Petroleum Company, a corporation of Delaware
No Drawing. Filed May 15, 1961, Ser. No. 110,616
14 Claims. (Cl. 149—19)

This invention relates to a method of plasticizing a solid propellant composition and to the composition thus modified. In another aspect it relates to a method of improving the low temperature properties of a solid propellant composition.

Solid propellants of a composite type are increasing in favor for use in propulsion devices such as missiles, rocket motors, gas generators and the like. Two serious problems connected with the use of such composite propellants involve the fabrication of the propellant grain and maintaining the integrity of the grain prior to and during combustion. One of the most convenient methods of fabricating a propellant grain is by casting the solid propellant mixture within the rocket casing. The composite propellant is a mixture of crystalline oxidizer and a polymeric material which acts as the fuel and binder for the solid oxidant. The propellant composition at the time of casting and prior to curing must have considerable fluidity to enable filling the rocket case under gravity flow and also the composition must readily release any gas bubbles that would otherwise be trapped and cause voids in the cured propellant. After the propellant is cured the grain must also possess a certain degree of flexibility or elasticity, especially at low temperatures, so that it will not develop cracks when subjected to stress or shock. Frequently rocket propellant compositions are deficient in the fluidity required for fabrication and the flexibility required of the cured grain. Plasticizing the composition through the incorporation of more highly fluid materials, such as low molecular weight polymers, can have the effect of providing both the fluidity on fabrication and flexibility of the cured grain if the proper plasticizing agent is selected. There is a tendency, however, for such plasticizers to migrate or bleed so that they are not in a position to modify the properties of the propellant as a whole, and furthermore adversely effect the surface properties of the propellant by reducing the adherence of the propellant to the restrictor and/or rocket case. The presence of many plasticizers in high concentration on the surface of the propellant interferes with ignition and/or burning characteristics of the grain. Some plasticizers are readily oxidized or otherwise deteriorate when exposed to air so that bleeding will often produce detrimental surface effects upon storage.

We have now discovered a method of plasticizing a propellant composition in order to improve its fluidity for ease of handling in fabrication of the grain and also to improve the low temperature properties of the cured propellant composition while at the same time greatly reducing the problem of plasticizer migration or bleeding within the propellant composition. When practicing according to our invention even very low molecular weight plasticizers can be used without a serious problem of plasticizer migration. As a result of this method of plasticizing a propellant composition substantially more reliable grains can be formed which will maintain their desired characteristics even after long periods of storage and under a variety of conditions at both high and extremely low temperatures. According to our invention a solid propellant composition is formed including an inorganic oxidizing salt and a synthetic polymeric binder which is formed by reacting a first uncured polymer of vinylidene-containing monomers, said polymer containing at least 2 acidic groups per molecule with a polyfunctional curing agent reactive with said acidic groups, and plasticizing the composition before said reaction with a second conjugated diene polymer having a viscosity lower than said first polymer and having a single acidic group attached to each molecule. By "polyfunctional curing agent" in this specification we mean to include organic compounds which contain 3 or more functional groups per molecule reactive with the acidic groups of the polymer in the propellant binder. While we do not wish to be limited by theory on the mechanism by which the plasticizer of our invention operates, it is believed that the single carboxy group of the plasticizer reacts with a free functional group of the curing agent which also couples the polyfunctional molecules of the polymer in the binder. The free or uncoupled end of the plasticizer can then serve to increase the elasticity of the propellant composition and improve its low temperature properties. The plasticizer, therefore, plays a double role since one end of the molecule is tied into the cross-linked structure of the propellant binder while the other end which is free serves as a plasticizing agent in the cured polymer. The improved low temperature properties in the cured propellant composition and the reduced tendency of the plasticizer to bleed or be extracted from the binder itself are demonstrated by the examples.

It is an object of our invention to provide an improved solid propellant composition which has been plasticized for improved fluidity for fabrication and enhanced elongation at low temperatures to which the cured composition may be subjected. Another object of our invention is to provide a method of plasticizing a propellant composition in such a manner that the plasticizer has a substantially reduced tendency to bleed or migrate within the propellant grain. Another object of our invention is to provide a propellant composition having a plasticizer which is tied into the cross-linked structure of the binder while at the same time serving to provide increased elongation of the propellant at low temperatures. Other objects, advantages and features of our invention will be apparent to those skilled in the art from the following disclosure.

The solid propellants which are modified according to our invention comprise an inorganic oxidizing salt and a synthetic polymeric binder. The binder is formed by reacting a first uncured conjugated diene liquid polymer containing at least two acidic groups per molecule with a polyfunctional organic compound that will react with the acidic groups present in the diene polymer. The binder also contains according to our invention, a plasticizing amount of a second conjugated diene polymer having a single terminal acidic group per molecule and a viscosity in the range of 10 to 500 poises at 77° F. A number of different inorganic oxidizing salts can be employed and generally these materials are well known in the art. Typical of such salts are the ammonium, alkali metal, and alkaline earth metal salts of nitric, perchloric and chloric acids, and admixtures thereof, such as sodium perchlorate, potassium perchlorate, magnesium perchlorate, ammonium perchlorate, lithium chlorate, strontium chlorate, potassium nitrate, sodium nitrate, calcium nitrate, ammonium nitrate and the like.

The conjugated diene polymers which are used to form the binder of the propellant can be either a homopolymer of a conjugated diene, copolymers of more than 1 conjugated diene or copolymers of conjugated dienes with other copolymerizable materials. In such copolymers the conjugated dienes should comprise a major amount of the incorporated monomer in the polymer. Conjugated dienes contain ordinarily from 4 to 12 carbon atoms per molecule and those containing 4 to 8 carbon atoms such as 1,3-butadiene, isoprene, piperylene, methyl-pentadiene, propylbutadiene, 1,3-octadiene and the like are preferred. Conjugated dienes can contain reactive substituents along the chain such as, for example, halogenated dienes of which chloroprene and fluoroprene are typical. Butadiene is preferred with isoprene and piperylene also being especially suitable. The copolymerizable monomers include those containing a $CH_2=C<$ group such as the vinyl-substituted aromatic compounds. The vinyl-substituted aromatics include sytrene, 1-vinylnaphthalene, 2-vinylnaphthalene, and alkyl, cycloalkyl, aryl, alkaryl, aralkyl, alkoxy, araloxy and dialkyamino derivatives thereof in which the total number of carbon atoms in the combined substituents does not exceed 12. Examples of these aromatic monomers include 3-methylstyrene (3-vinyltoluene),
4-n-propylstyrene,
4-dodecylstyrene,
4-cyclohexylstyrene,
4-phenylstyrene,
2-ethyl-4-benzylstyrene,
4-p-tolylstyrene,
4-(4-phenyl-n-butyl)styrene,
4-methoxystyrene,
3,5-diphenoxystyrene,
4-dimethylaminostyrene,
4-methoxy-6-di-n-propylaminostyrene,
4,5-dimethyl-1-vinylnaphthalene,
8-phenyl-1-vinylnaphthalene,
4-methoxy-1-vinylnaphthalene,
3,6-dimethylamino-1-vinylnaphthalene, and the like. Block or random copolymers of conjugated dienes and vinyl-substituted aromatic compounds can be formed. Block copolymers can also be prepared between conjugated dienes and polar monomers which are introduced after the conjugated diene has polymerized. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, araloxy and dialkylamino groups in which the total number of carbon atoms in the combined constituents does not exceed 12. Any alkyl groups on the alpha or gamma carbons with respect to the nitrogen should be tertiary alkyl groups. Examples of polar monomers of this type include 2-vinylpyridine, 3,5-diethyl-4-vinylpyridine, 3-n-dodecyl-2-vinylpyridine, 5-cyclohexyl-2-vinylpyridine, 4-phenyl-2-vinylpyridine, 3-benzyl-4-vinylpyridine, 6-methoxy-2-vinylpyridine, 4-phenoxy-2-vinylpyridine, 4-dimethylamino-2-vinylpyridine, 2-vinylquinoline, 3-methyl-4-ethoxy-2-vinylquinoline, 3-vinylisoquinoline, 4-phenyl-1-vinylisoquinoline, and the like.

Other polar monomers include acrylic and alkacrylic acid esters, nitriles, and N,N-disubstituted amides, such as methyl acrylate, ethyl acrylate, butyl acrylate, methyl methacrylate, ethyl methacrylate, propylmethacrylate, butyl methacrylate, methyl ethacrylate, ethyl ethacrylate, isopropyl ethacrylate, acrylonitrile, methacrylonitrile, N,N-dimethylacrylamide, N,N-diethylmethacrylamide and the like. Vinylfuran and N-vinylcarbazole can also be used.

The above named monomers can be polymerized to form terminally reactive polymers by initiating the polymerization with an organo alkali metal compound containing from 2 to 4 or more alkali metal atoms per molecule. Lithium is the preferred alkali metal in these initiators. The organo alkali metal compounds can be prepared in several ways, such as, by replacing halogens in an organic halide with alkali metals, by direct addition of alkali metals to a double bond, or by reacting an organic halide with a suitable alkali metal compound. Preparation of the initiator should be carried out in a polar solvent such as diethyl ether.

The organo alkali metal initiators employed for preparing the polymers having terminally reactive groups can be represented by the formula $RM_x$ where R is the hydrocarbon radical selected from the group consisting of aliphatic, cycloaliphatic and aromatic radicals, M is an alkali metal including sodium potassium, lithium, cesium and rubidium, and $x$ is an integer of 2 to 4. The R in the formula generally contains from 1 to 20 carbon atoms although higher molecular weight compounds can be used. By far the best results are obtained with organo lithium compounds which give very high conversions to the terminally reactive polymer. Examples of poly alkali metal substituted hydrocarbons of this type include 1,4-dilithiobutane, 1,5-dipotassiopentane, 1,4-disodio-2-methylbutane, 1,10-dilithiodecane, 1,20-dilithioeicosane, 1,4-dilithio-2-methyl-2-butene, 1,4-dipotassio-2-butene, dilithionaphthalene, 4,4'-dilithiobiphenyl, dilithioanthracene, 1,2-dilithio-1-diphenylethane, 1,2-dilithio-1,2-diphenylethane, 1,4-dilithiocyclohexane, 1,3,5-trilithiocyclohexane, 1,4-dirubidiobutane, 1,8-dicesiooctane, 1,5-dilithio-3-pentyne, dilithiophenanthrene, 1,2-dilithiotriphenylethane, dilithiomethane, and the like.

Certain specific initiators give better results than others and are preferred for preparing the polymers. Lithium adducts of naphthalene, methyl naphthalene and anthracene give very good results. A preferred initiator is 1,2-dilithio-1,2-diphenylethane (lithium-stilbene adduct). Other preferred initiators include dilithium adducts of 2,3-dialkyl-1,3-butadienes, for example, 2,3-dimethyl-1,3-butadiene, and especially the dilithium adducts of isoprene and 1,3-butadiene wherein the adduct contains from 1 to 7 diene units per molecule.

In the polymerization using initiators of this type the organo radical of the organo alkali metal compound is incorporated in the polymer chain and the alkali metal atoms are attached terminally to each end of the polymer chain. In general the polymers will be linear having two ends; however, polymers containing more than 2 ends can be prepared. These polymers can be represented by the formula $QM_n$ where Q comprises the polymer as previously described, M is an alkali metal and $n$ is an integer of 2 to 4.

The polymers which can be improved particularly in low temperature properties according to our invention are the liquid conjugated diene polymers which ordinarily have molecular weights in the range of about 1000 to about 2000. The molecular weight of the polymer can be controlled by varying the amount of initiator charged to the polymerization reaction. Usually the initiator is used in amounts between about 5 and about 100 millimoles per 100 grams of monomer with the higher amounts of initiator resulting in polymers of lower molecular weight. Ordinarily the amount of initiator does not exceed about 30 millimoles per 100 grams of monomer. The temperature of the polymerization is generally in the range of about −100 to 150° C. and preferably between −75 and +75° C. The temperature used will depend upon the monomers and initiators used in preparing the polymers. The polymerization should be carried out in the presence of a siutable diluent which is predominantly hydrocarbon, such as benzene, toluene, cyclohexane, xylene, n-hexane, n-heptane, isooctane and the like. In general this diluent is a paraffin, cycloparaffin or aromatic which contains from 4 to 10 carbon atoms per molecule. Relatively small amounts of other materials can be present, such as ethers in which the initiator was dissolved or a polar compound which is charged to encourage random copolymerization between a conjugated diene and a vinyl-substituted aromatic compound. Ordinarily, however, it is desired that such polar compounds be maintained at a minimum in preparing conjugated diene polymers which have improved low temperature properties.

The polymers which result from the above polymerization contain an alkali metal atom on each end of the polymer molecule and are therefore reactive with various materials which can be used to replace the terminal alkali metal atoms with more stable reactive groups. The polymers employed in the propellants for our invention are reacted to replace the alkali metal atoms with acidic groups such as SOH, SO₂H, SO₃H, COOH, SeO₂H, SeO₃H, SiO₂H, SnO₂H, SbO₂H, SbOH, SbO₃H₂, TeO₂H, TeO₃H, AsO₂H, AsOH, AsO₃H₂, AsO₃H₃. Reagents which can be used to form these terminal acidic groups include carbon dioxide, sulfuryl chloride and the like. The resulting polymers are hydrolyzed to remove the alkali metal and replace it with an acidic hydrogen. The reaction of a terminally reactive polymer with the acid-forming reagents can be carried out over a wide temperature range, for example, from −75 to +75° C. Preferably the amount of reagent used to add the acid group is in excess of stoichiometric.

These terminally reactive polymers prepared as described above can be characterized as containing at least about 2 terminal acidic groups per molecule. While the preponderance of the polymer molecules in the total polymeric composition are polyfunctional, it should be understood that some mono- and/or non-functional polymer molecules can also be present in small amounts. Minute amounts of moisture in the terminating agent tend to reduce the number of polyfunctional molecules. As an illustration, a polymeric composition in which there is an average of 1.5 to 2.5 terminal acidic groups per molecule can be characterized as a terminally reactive polymer having about 2 terminal acidic groups per molecule.

Another type of polymer which can be used in the binder of the propellant are copolymers of the conjugated dienes above-named and unsaturated carboxylic acids. The acids which can be used are those containing up to 36 carbon atoms and having from 1 to 5 double bonds and 1 or 2 carboxyl groups per molecule. Also included are the so-called dimerized acids, that is, acids where two molecules of an acid are linked by destroying one of the double bonds. The acids which can be copolymerized with conjugated dienes in this manner include, for example, such acids as acrylic acid, methacrylic acid, itaconic acid, vinylacetic acid, palmitoleic acid, oleic acid, ricinoleic acid, arachidonic acid, erucic acid, selacholeic acid, fumaric acid, maleic acid, and the like. The reaction of the diene and the unsaturated carboxylic acid is carried out over a wide range of temperatures depending upon the monomer and particular acid employed, for example, temperatures between about −50 and about +100° C. The amount of acid employed in the reaction can vary to provide polymers having acid equivalents from as low as 0.005 to as high as 0.2 equivalent per 100 grams of polymer product. The resulting polymers, however, will contain at least 2 acidic groups per molecule and ordinarily the number of acidic groups will be substantially greater than 2.

The polymers containing acid groups can be cured in our invention by reaction with compounds which contain 3 or more functional groups that will react with the acid groups. The most typical and preferred acid group in the binder compositions is the carboxy group. Acidic containing polymers can be cured by reacting them with polyfunctional organic compounds which contain 3 or more aziridinyl groups per molecule. Other polyfunctional compounds which can be used to cure carboxy containing polymers are the aliphatic polyepoxides, that is, compounds containing 3 or more epoxy groups per molecule. Examples of such compounds are triepoxy hexane, triepoxydecane, 2,3-6,7-11,12-triepoxydodecane, 2,3-5,6-diepoxy-9-epoxy ethyldodecane, pentaepoxyeicosane, 2,3,5-triepoxy ethyl-9,10-epoxyhexadecane, and the like. In these compounds the percent epoxy oxygen will usually exceed 0.5 percent and will preferably be in the range of from 2 to 12 percent or higher. A particularly useful compound of this class is a liquid epoxidized polybutadiene containing 3 or more epoxy groups per molecule. These materials which comprise a preferred species can be prepared by treating a liquid polymer of butadiene with a peracid, such as performic or peracetic acid. Rubbery solids can be prepared using from 1 to 10 equivalents of the epoxy compound based on equivalents of the epoxy groups present per carboxy group equivalent present in the carboxy terminated polymers. The preferred coupling or curing agents are the polyaziridinyl compounds containing 3 or more aziridinyl groups per molecule. Polyfunctional curatives such as the triazines and triphosphatriazines can be employed in limited amounts. The preferred curative of the aziridinyl type are the triaziridinyl phosphine oxides or sulfides as represented by the formula:

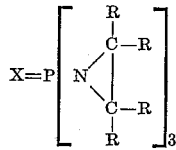

wherein X is selected from the group consisting of oxygen and sulfur, P is phosphorus, the R's are radicals containing up to a total of 20 carbon atoms per aziridinyl group, each R being selected from the group consisting of hydrogen, alkyl, cycloalkyl, and aryl radicals and composites thereof such as alkaryl, aralkyl, and the like. Specific phosphine reactants which can be used include tri(1-aziridinyl)phosphine oxide,
tri(2-isopropyl-1-aziridinyl)phosphine oxide,
tri(2,2-dimethyl-1-aziridinyl)phosphine oxide,
tri(2-dodecyl-1-aziridinyl)phosphine oxide,
tri(2-eicosyl-1-aziridinyl)phosphine oxide,
tri(2-ethyl-3-cyclohexyl-1-aziridinyl)-phosphine oxide,
tri(2-phenyl-1-aziridinyl)phosphine oxide,
tri(2-methyl-3-benzyl-1-aziridinyl)phosphine oxide,
tri[2-n-propyl-3(2-phenylethyl)-1-aziridinyl]phosphine oxide,
tri[2-heptyl-3(2,4-dimethylphenyl)-1-aziridinyl]phosphine oxide,
tri(1-aziridinyl)phosphine sulfide,
tri(2-methyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-amyl-3-benzyl-1-aziridinyl)phosphine sulfide, and the like. Mixtures of tri(2-methyl-1-aziridinyl)phosphine oxide and phenyl-bis(2-methyl-1-azirdinyl phosphine oxide are particularly effective.

In preparing the solid propellant the oxidant and the liquid acidic containing polymer are mixed together and this mixture is plasticized by the conjugated diene polymer by adding this monofunctional polymer either before or after incorporating the oxidant. The conjugated dienes which can be used to form this plasticizer ordinarily have 4 to 8 carbon atoms per molecule and preferably from 4 to 6 carbon atoms per molecule. Butadiene, isoprene and piperylene are the preferred monomers. Copolymers of conjugated dienes as well as copolymers of conjugated dienes with other copolymerizable monomers such as described in connection with the acidic containing polymer can be employed providing the conjugated diene is used in major amount. We prefer that plasticizer be a homopolymer of 1,3-butadiene having its unsaturation in the form of 0 to 25 percent vinyl, 0 to 60 percent trans, and 30 to 85 percent cis, and having a viscosity in the range of 10 to 500 poises at 77° F., preferably 20 to 300 poises.

A preferred method for preparing the plasticizer is through the use of a monofunctional organo alkali metal initiator, such an initiator is normally a hydrocarbon which contains a single alkali metal atom, preferably a single lithium atom, such as methyllithium, n-butyllithium, n-decyllithium, phenyllithium, naphthyllithium, p-tolyllithium, cyclohexyllithium, isopropylrubidium, 4- butyl-phenylsodium, 4-cyclohexylbutylpotassium, 4-phenylbutylcesium, and the like. Lithium initiators should be used to prepare low vinyl polybutadiene. In the recovery of these polymers, the alkali metal atom is replaced with an acidic group as described above to form the monofunctional polymers employed in the practice of our invention.

In the preparation of the solid propellant the liquid polymers, the inorganic oxidizing salt and the polyfunctional coupling agent are mixed together and then the temperature of the mixture is increased so that reaction occurs between the acidic groups of the polymers and the functional groups of the coupling agent. In the preparation of binder from liquid polymer of this type the polymers and the aziridinyl compounds are placed in a suitable dispersant type mixer and thoroughly mixed for a period of 1 to 10 minutes. The oxidizer which is finely powdered to a size in the range of from 1 to 300 microns is then added and mixing is continued. During the latter mixing step the temperature is gradually increased to a temperature between about 100 to 300° F., preferably between about 150 and 200° F. The material at this stage is viscous slush which is then poured into a rocket case or suitable mold. The filled mold is then placed in an oven and cured for 24 to 48 hours or more at temperatures in the range of about 150 to 200° F.

The total amount of curative used is preferably about stoichiometric to somewhat above stoichiometric, for example, about 125 percent of the stoichiometric amount of curative based upon the acid equivalents of the polymers. With polymers in the lower range of equivalents, amounts of curative up to 150 percent of stoichiometric can be readily employed and with polymers in the higher range of acid equivalents as low as 10 percent of the stoichiometric amount of curative is effective. When using the lower amounts of curative the excess carboxyl groups are useful in devoloping adherence to surfaces such as the rocket cases, oxidizer particles or to glass or ceramic surfaces.

The solid propellants of this invention can contain, in addition to the binder fuel, a powdered metal such as aluminum and various compounding ingredients commonly employed in making composite propellants, such as plasticizers, oxidation inhibitors, reinforcing agents, wetting agents, modifiers, vulcanizing agents, curing agents, accelerators, burning rate catalysts, and the like. Propellant compositions can be formed into a grain having any desired shape or geometry, such as grains of the internal, external, or internal-external burning types. These grains can be molded as described and can be restricted with any suitable and well known restricting material such as rubber. Examples of other powdered metals which can be incorporated into the propellant include boron, magnesium, beryllium, and the like. Alloys can also be used such as the aluminum alloys of boron, magnesium, manganese, copper or the like. Silicon can be used and the term "metal" is used herein to include silicon.

The rocket propellants of this invention have in general the composition range as follows:

| | Weight, percent |
|---|---|
| Binder | 8–25 |
| Acidic polymer | 7–24 |
| Plasticizer (liquid diene polymer) | 1–18 |
| Inorganic oxidizing salt | 62–92 |
| Powdered metal | 0–30 |

Preferably the propellant compositions contain from 80 to 86 weight percent inorganic oxidizing salt and from 14 to 20 weight percent binder. The binder includes both the polyfunctional acidic polymer and the monofunctional diene plasticizer. From 10 to 19 weight percent of the propellant composition in this preferred formulation is the polyfunctional acidic polymer while the plasticizer comprises from 1 to 4 weight percent of the propellant.

Various types of compounding ingredients including fillers such as carbon black and mineral fillers, can be incorporated into the polymer prior to reaction of the polymer with the polyfunctional coupling agent. Where it is desired to closely control the burning rate of the propellant compositions suitable burning rate catalysts can be incorporated therein. These catalysts include materials such as ferrocyanides sold under various trade names, such as Prussian blue, Steel blue, Bronze blue, Turnbull's blue, Chinese blue, New blue, Antwerp blue, Mineral blue, Paris blue, Berlin blue, Hamburg blue, Williamson blue, and the like. Other useful burning rate catalysts include copper chromite, ammonium dichromate, potassium dichromate, sodium dichromate and the like.

The advantages of our invention are illustrated by the following examples. In these examples specific conditions and materials are presented as being typical and should not be construed to limit our invention unduly.

*Example I*

A dicarboxy polymer was prepared by reacting 100 grams of butadiene in 780 grams of cyclohexane, using 20 mmols of dilithio dimethyl butadiene adduct as initiator. Polymerization time was two hours at a temperature of 120° F. The polymerization product was reacted with $CO_2$. The product obtained had an estimated molecular weight in the range of 5000 to 6000; the carboxy content was 1.02 percent, viscosity 1108 poises, vinyl content 33.7 percent, trans form 39.7 percent.

A rocket propellant having the following formulation was prepared with this polymer:

| | Weight, percent |
|---|---|
| Polymer | 19.63 |
| Tri(methyl aziridinyl)phosphine oxide | 0.37 |
| Ammonium perchlorate, 200 microns | 56.00 |
| Ammonium perchlorate, 18 microns | 24.00 |

The physical properties of this propellant and those of the following example are given in Table I.

*Example II*

A monocarboxy polymer was prepared by reacting 100 grams of butadiene in 780 parts of cyclohexane, using 0.10 mol of n-butyllithium as initiator. Polymerization time was two hours at a temperature of 120° F. The product obtained had a carboxy content of 1.73 and an estimated molecular weight of 1000. It is also estimated that the vinyl content is 8.0 percent, trans form 50 percent and cis form 42 percent.

A rocket propellant was prepared using the foregoing monocarboxy polymer to replace part of the dicarboxy polymer of Example I. The curative was adjusted to be on an equivalent molar basis.

| | Weight, percent |
|---|---|
| Polymer dicarboxy | 17.79 |
| Polymer monocarboxy | 1.78 |
| Tri(methyl aziridinyl)phosphine oxide | 0.43 |
| Ammonium perchlorate (200 microns) | 56.00 |
| Ammonium perchlorate (18 microns) | 24.00 |

TABLE I

| Propellant | Temperature, °F. | $S_m$, p.s.i. | $S_b$, p.s.i. | $E_m$, percent | $E_b$, percent | Young's Modulus |
|---|---|---|---|---|---|---|
| Example I | 170 | 67 | 58 | 29.2 | 39.5 | 341 |
| | 75 | 107 | 92 | 37.5 | 49.7 | 502 |
| | −40 | 254 | 185 | 26.4 | 40.5 | 3,573 |
| | −70 | 619 | 493 | 14.0 | 23.2 | 8,107 |
| Example II | 170 | 77 | 67 | 24.7 | 34.0 | 448 |
| | 75 | 125 | 110 | 40.4 | 55.4 | 557 |
| | −40 | 375 | 294 | 37.7 | 56.8 | 3,317 |
| | −70 | 617 | 545 | 17.0 | 28.7 | 7,163 |

$S_m$ and $S_b$ are maximum tensile strength and tensile strength at break, respectively.
$E_m$ and $E_b$ are elongation at maximum tensile strength and at break, respectively.

It will be seen from the foregoing data that the replace- (Brookfield viscosity at 77° F.) for the polymers from the foregoing runs were as follows:

| Run | Microstructures, percent | | Brookfield, Visc. at 77° F. | COOH, percent |
|---|---|---|---|---|
| | Trans | Vinyl | | |
| Carboxy-telechelic polymer | 41.5 | 26.2 | 580 | 1.25 |
| Plasticizer A | 50.9 | 7.1 | 14 | |
| Plasticizer B | 53.1 | 7.6 | 30 | 1.28 |
| Plasticizer C | 20.9 | 61.4 | 49 | |
| Plasticizer D | 18.9 | 59.7 | 136 | 1.55 |

Eighty parts by weight of the dicarboxy terminated polymer were blended with 20 parts of the liquid plasticizer. These gum stocks were then cured at 200° F. for 16 hours and 96 hours and the cured stocks were then tested for extractability of the plasticizer. The samples were extracted in normal heptane for 3 hours at 60° C. and then for 3 hours at 30° C.

The blends of the liquid dicarboxy terminated polybutadiene and the monocarboxy and non-functional polybutadienes were cured using 1.5 equivalents of tri(2-methyl-1-aziridinyl)phosphine oxide. The carboxy content of each composition was calculated and 1.5 equivalents of curative added, based on the carboxy content. The runs are summarized in the following table.

TABLE IV

[16 hour cure at 200° F.]

| Plasticizer | Vr* | Percent Extractable |
|---|---|---|
| None | 0.219 | 2.7 |
| A—non-functional | 0.167 | 17.9 |
| B—mono-functional | 0.152 | 9.3 |
| C—non-functional | 0.166 | 19.8 |
| D—mono-functional | 0.131 | 12.0 |

[96 hour cure at 200° F.]

| | | |
|---|---|---|
| None | 0.331 | 1.7 |
| A—non-functional | 0.272 | 10.0 |
| B—mono-functional | 0.278 | 4.3 |
| C—non-functional | 0.284 | 10.8 |
| D—mono-functional | 0.265 | 5.1 |

*Vr is the inverse swelling ratio of the cured polymer in n-heptane and is an indication of the degree of cure of the polymer. It is obtained by dividing the volume of dry polymer by the combined volume of polymer and imbibed solvent.

The above results show that after 16 hours of cure the greater part of the non-functional polymer was extractable whereas much less of the mono-functional plasticizer was removed. The extractable matter in all compositions decreased at the higher cure level but even then substantially less of the mono-functional plasticizer was removed. It is apparent, therefore, that a substantially improved method of plasticizing a propellant composition for decreased plasticizer migration has been provided. As will be apparent to those skilled in the art various modifications can be made in our invention without departing from the spirit or scope thereof.

We claim:

1. A solid propellant composition comprising an inorganic oxidizing salt and a synthetic polymeric binder formed by reacting a first uncured polymer of conjugated dienes containing 4 to 12 carbon atoms per molecule, said uncured polymer containing at least about two acidic groups per molecule, with a polyfunctional organic compound containing at least 3 functional groups reactive with said acidic groups and selected from the group consisting of aliphatic polyepoxides, polyaziridinyl triazines, polyaziridinyl triphosphatriazines, triaziridinyl phosphine oxides, and triaziridinyl phosphine sulfides, said binder containing a plasticizing amount of a second uncured polymer of conjugated dienes containing 4 to 12 carbon atoms per molecule, said second uncured polymer having a viscosity lower than said first polymer and having a single terminal acidic group per molecule.

2. A solid propellant composition comprising an inorganic oxidizing salt and a synthetic polymeric binder formed by reacting a first uncured liquid polymer of conjugated dienes containing from 4 to 12 carbon atoms per molecule, said first polymer containing at least about two acidic groups per molecule, with a polyfunctional organic compound containing at least 3 functional groups reactive with said acidic groups and selected from the group consisting of aliphatic polyepoxides, polyaziridinyl triazines, polyaziridinyl triphosphatriazines, triaziridinyl phosphine oxides, and triaziridinyl phosphine sulfides, said binder containing a plasticizing amount of a second liquid polymer of conjugated dienes containing from 4 to 12 carbon atoms per molecule, said second polymer having a single terminal acidic group per molecule and having a viscosity lower than said first polymer.

3. A composition of claim 2 wherein said first polymer contains its acidic groups positioned at each end of the polymer molecules.

4. The composition of claim 2 wherein said first polymer is a copolymer of a conjugated diene with an unsaturated carboxylic acid having a maximum of 36 carbon atoms, from 1 to 5 double bonds, and 1 to 2 carboxy groups.

5. A propellant composition comprising about 62 to 92 weight percent inorganic oxidizing salt, 0 to 30 weight percent powdered metal, and 8 to 25 weight percent synthetic polymeric binder formed by reacting a first uncured polymer of a conjugated diene having 4 to 8 carbon atoms per molecule with a tri-functional organic compound selected from the group consisting of aliphatic polyepoxides, polyaziridinyl triazines, polyaziridinyl triphosphatriazines, triaziridinyl phosphine oxides, and triaziridinyl phosphine sulfides, said first polymer containing at least about 2 terminal carboxyl groups per molecule and said tri-functional organic compound being reactive wth said carboxy groups, said binder containing a plasticizing amount of a second liquid polymer of a conjugated diene having 4 to 6 carbon atoms per molecule, said second liquid polymer having a viscosity in the range of 10 to 500 poises at 77° F. and 1 terminal carboxy group per molecule.

6. A composition of claim 4 wherein said first polymer makes up about 7 to 24 weight percent of said propellant composition and said second plasticizing polymer makes up about 1 to 18 weight percent of said composition.

7. A solid propellant composition comprising about 80 to 86 weight percent ammonium perchlorate and about 14 to 20 weight percent polymeric binder formed by reacting a tri-aziridinyl compound having the formula

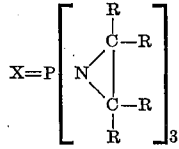

wherein X is selected from the group consisting of oxygen and sulfur, P is phosphorus, the R's are radicals containing up to a total of 20 carbon atoms peraziridinyl group, each R being selected from the group consisting of hydrogen, alkyl, cycloalkyl, aryl radicals and composites thereof, with a mixture of a first polymer of 1,3-butadiene having about 2 terminal carboxy groups per molecule and a viscosity in the range of 500 to 3000 poises at 77° F. and a second polymer of 1,3-butadiene having a single terminal carboxy group per molecule and a viscosity in the range of 20 to 300 poises at 77° F., said first polymer making up 10 to 19 weight percent of said composition and said second polymer making up 1 to 4 weight percent of said propellant composition.

8. A composition of claim 7 wherein said triaziridinyl compound is tri(2-methyl-1-aziridinyl)phosphine oxide and said first and second polymers are polybutadienes.

ment of 10 percent of the dicarboxylic high molecular weight polymer with monocarboxylic low molecular weight polymer results in approximately 15 percent increase in the tensile strength at 170° F. and at 75° F., and approximately a 22 percent increase in the elongation at −70° F. Since the plasticizing element of the propellant composition is firmly fixed in the cured binder, it will not migrate or "bleed," and therefore adhesion of the propellant grain for restrictor and rocket case, ignition and burning characteristics will not be adversely affected, especially after long periods of storage.

*Example III*

A monocarboxy polymer was made as described in Example II using the following recipe.

| Ingredients: | Parts by weight |
|---|---|
| Butadiene | 100 |
| Cyclohexane | 780 |
| n-Butyllithium (0.02 mole) | 1.38 |

The product had the following properties.

| | |
|---|---|
| Viscosity, poises | 118 |
| Carboxyl, percent | 0.69 |
| Vinyl, percent | 8 |
| Molecular weight, estimated | 5000 |

A polymer having a viscosity of 2076 poises at 77° F., a vinyl content of 35 percent and a carboxy content of 0.735 percent was prepared using the following recipe. Reaction time was 2 hours at 122° F. The conversion was quantitative and the polymerization product was reacted with $CO_2$.

| | |
|---|---|
| Toluene (solvent) | 1200 parts by weight. |
| Butadiene | 100 parts by weight. |
| Dilithium - dimethylbutadiene adduct | 20 millimols. |

This dicarboxy polymer was evaluated as a propellant binder alone and in admixture with 10 parts by weight of the above monocarboxy polymer per 100 parts of the dicarboxy polymer.

These polymers were evaluated in the following recipe:

| | Parts by weight |
|---|---|
| Binder | 19.73 |
| Tri(methyl aziridinyl)phosphine oxide | 0.27 |
| Ammonium perchlorate (200 microns) | 56.00 |
| Ammonium perchlorate (18 microns) | 24.00 |

The properties of the control and the mixture in which 10 phr. of liquid monocarboxy polymer was present are shown in the following tables:

TABLE II
[Binder is dicarboxy polymer]

| T. | $S_m$ | $S_b$ | $E_m$ | $E_b$ | E |
|---|---|---|---|---|---|
| 170 | 78 | 76 | 86.8 | 91.1 | 139 |
| 75 | 105 | 103 | 94.5 | 99.7 | 169 |
| −40 | 349 | 319 | 85.2 | 104.2 | 3,443 |
| −70 | 616 | 532 | 17.7 | 26.6 | 6,787 |

TABLE III
[Binder is a blend of dicarboxy and monocarboxy polymers]

| T. | $S_m$ | $S_b$ | $E_m$ | $E_b$ | E |
|---|---|---|---|---|---|
| 170 | 61 | 58 | 103.0 | 115.5 | 89 |
| 75 | 85 | 81 | 103.6 | 117.4 | 132 |
| −40 | 268 | 179 | 77.9 | 130.6 | 2,587 |
| −70 | 577 | 504 | 22.7 | 39.7 | 6,707 |

Improvements in both high and low temperature elongation is apparent from the above data for the propellant compositions of our invention, even though the polymers blended had substantially the same molecular weight.

*Example IV*

The data of this example demonstrate the reduced extractability of the plasticizers employed according to this invention and are indicative of the reduced tendency of the plasticizer to bleed or to migrate in the propellant composition. A carboxy terminated polymer was prepared according to the following recipe:

| | |
|---|---|
| 1,3-butadiene, parts by weight | 100 |
| Cyclohexane, parts by weight | 1000 |
| Lithium-methylnaphthalene-isoprene initiator, millimoles | 20 |
| Temperature, ° F. | 122 |
| Time, hours | 1.5 |
| Conversion, quantitative. | |

The initiator had been prepared by reacting isoprene, methylnaphthalene (a commercial mixture of alpha- and beta-methylnaphthalenes) and lithium in ether using the following proportions of ingredients:

| | |
|---|---|
| Methylnaphthalene, grams (14.2 ml.) | 14.2 |
| Isoprene, grams (10.0 ml.) | 6.6 |
| Lithium wire, grams | 2.2 |
| Diethyl ether, ml. | 47.2 |
| Temperature, ° F. | −15 |
| Time, hours | 40 |

To the reaction mixture was added 4 moles of butadiene per mole of initiator to effect solubilization. The amount of butadiene was calculated from the normality of the reaction mixture which was determined by withdrawing a sample and titrating it with 0.1 N hydrochloric acid.

Immediately following the polymerization the unquenched reaction mixture was carbonated using a T-tube. Carbon dioxide, under a pressure of 15–18 p.s.i.g., and the polymer solution were fed into separate arms of the tube where they were mixed. The carbonated polymer solution was acidified with a hydrochloric acid-isopropyl alcohol mixture and washed with water until neutral. The major portion of the solvent was removed under vacuum and the remainder by purging with nitrogen.

The polymerization recipe for plasticizers A and B was as follows:

| | |
|---|---|
| 1,3-butadiene, parts by weight | 100 |
| Cyclohexane, parts by weight | 780 |
| n-Butyllithium, millimoles | 40 |
| Temperature, ° F. | 122 |
| Time, hours | 4 |
| Conversion, quantitative. | |

Two runs were made. The first designated as plasticizer A was not carbonated. The unquenched reaction mixture was treated with a hydrochloric acid-isopropyl alcohol mixture, washed with water until neutral, and the solvent removed as described for the above carboxy-telechelic polymer.

The polymer from the second run, designated as plasticizer B was carbonated and the polymer recovered as described above.

The polymerization recipe for plasticizers C and D was as follows:

| | |
|---|---|
| 1,3-butadiene, parts by weight | 100 |
| Cyclohexane, parts by weight | 1000 |
| n-Butyllithium, millimoles | 40 |
| Tetrahydrofuran, parts by weight | 5 |
| Temperature, ° F. | 86 |
| Time, hours | 1.5 |
| Conversion, quantitative. | |

Two runs were made as before and the polymer from the second run was carbonated as hereinbefore described to form plasticizer D. Both products were recovered as described above.

Microstructures, carboxy contents and viscosities

9. A method of preparing a solid propellant composition which comprises forming a mixture of inorganic oxidizing salt in a first uncured polymer of conjugated dienes containing from 4 to 12 carbon atoms per molecule, said first uncured polymer containing at least about 2 acidic groups per molecule, plasticizing said mixture with a second polymer of conjugated dienes containing from 4 to 12 carbon atoms per molecule, said second polymer having a lower viscosity than said first polymer and having a single terminal acidic group per molecule, and curing the resulting polymers by reacting same with a polyfunctional organic compound containing at least 3 functional groups reactive with said acidic groups and selected from the group consisting of alphatic polyepoxides, polyaziridinyl triazines, polyaziridinyl triphosphatriazines, triaziridinyl phosphine oxides, and tri-aziridinyl phosphine sulfides.

10. A method of preparing a solid propellant composition which comprises forming a mixture of an inorganic oxidizing salt, a first polymer of conjugated dienes containing from 4 to 12 carbon atoms per molecule, said first polymer containing at least about 2 terminal acidic groups per molecule and a plasticizing amount of a second liquid polymer of conjugated dienes containing from 4 to 12 carbon atoms per molecule, said second polymer having a viscosity lower than said first polymer and containing a single terminal acidic group per molecule, and curing the resulting mixture by reacting the acidic groups on said first and second polymers with a tri-functional organic compound selected from the group consisting of aliphatic polyepoxides, polyaziridinyl triazines, polyaziridinyl triphosphatriazines, triaziridinyl phosphine oxides, and triaziridinyl phosphine sulfides.

11. A method of forming 100 parts by weight of solid propellant composition which comprises mixing about 62 to 92 parts of an inorganic oxidizing salt, 0 to 30 parts of powdered metal, 7 to 24 parts of a first polymer of conjugated diene containing 4 to 8 carbon atoms per molecule, said first polymer having about 2 terminal carboxy groups per molecule and a viscosity in the range of 200 to 5000 poises at 77° F., and 1 to 18 parts of a second polymer of a conjugated diene having 4 to 6 carbon atoms per molecule, said second polymer having a viscosity in the range of 20 to 300 poises at 77° F., and a single terminal carboxyl group per molecule, and curing the resulting mixture by reacting said first and second polymers with a tri-aziridinyl compound having the formula

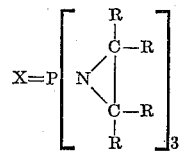

wherein X is selected from the group consisting of oxygen and sulfur, P is phosphorus, the R's are radicals containing up to a total of 20 carbon atoms per aziridinyl group, each R being selected from the group consisting of hydrogen, alkyl, cycloalkyl, aryl radicals and composites thereof, at a temperature in the range of 100 to 300° F.

12. The method of claim 11 wherein 80 to 86 parts of said salt are mixed with 10 to 19 parts of said first polymer and 1 to 4 parts of said second polymer.

13. A method of claim 12 wherein said salt is ammonium perchlorate, said first and second polymers are polybutadienes, and said aziridinyl compound is tri-(2-methyl-1-aziridinyl)-phosphine oxide.

14. A method of claim 12 wherein the mixture of salt and liquid polymer is poured as a slush into a rocket case and cured in situ.

References Cited by the Examiner

UNITED STATES PATENTS 2,994,598  8/1961  Dickey _____ 149—19

OTHER REFERENCES

Chem. and Eng. News, August 1, 1960, p. 35.
Chem. and Eng. News, August 8, 1960, p. 53.

LEON D. ROSDOL, *Primary Examiner.*

B. R. PADGETT, *Assistant Examiner.*